J. A. TURNER.
SPRING BOLSTER BEARING FOR CAR TRUCKS.
APPLICATION FILED OCT. 20, 1914.
1,141,436. Patented June 1, 1915.
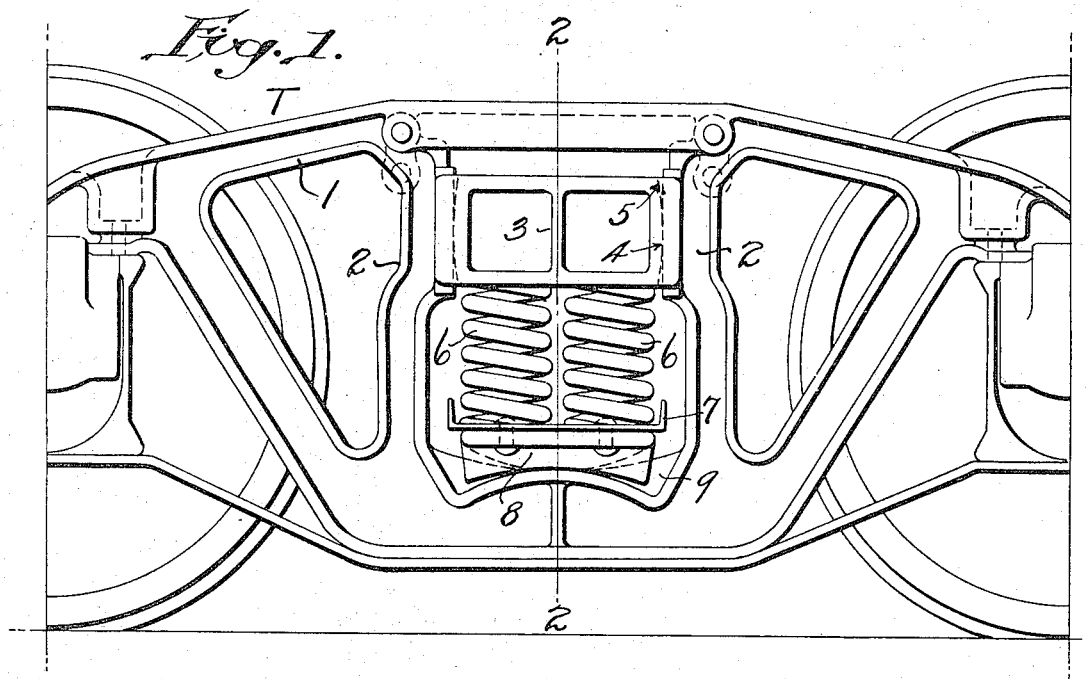
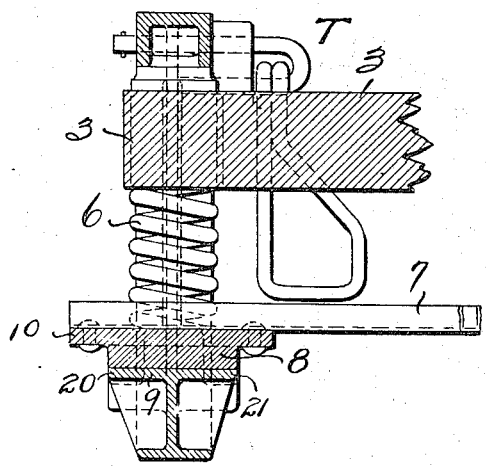
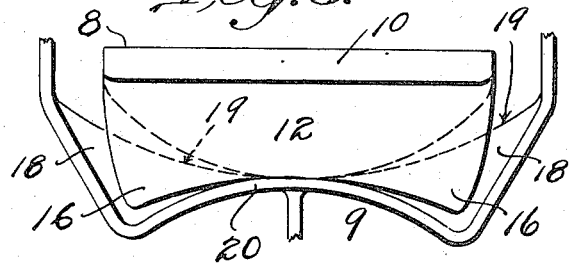
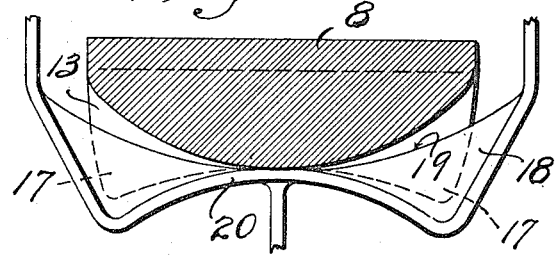
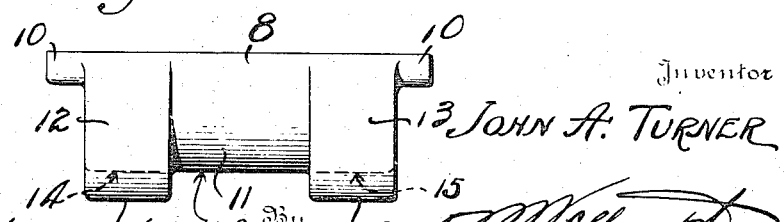
Inventor
JOHN A. TURNER
Witnesses

UNITED STATES PATENT OFFICE.

JOHN A. TURNER, OF MOBILE, ALABAMA.

SPRING-BOLSTER BEARING FOR CAR-TRUCKS.

1,141,436.      Specification of Letters Patent.      Patented June 1, 1915.

Application filed October 20, 1914. Serial No. 867,635.

*To all whom it may concern:*

Be it known that I, JOHN A. TURNER, a citizen of the United States, residing at Mobile, in the county of Mobile and State of Alabama, have invented certain new and useful Improvements in Spring-Bolster Bearings for Car-Trucks, of which the following is a specification.

This invention relates to the general subject of car trucks and has particular reference to a novel spring bolster bearing that is specially designed to give greater flexibility to the truck frames.

It is a well known fact that car trucks of the rigid type, or trucks whose opposite frame members are rigidly connected are subjected to many severe and damaging strains owing to uneven portions in the tracks, low joints, and also the shock of coupling heavily loaded cars. That is to say, trucks of this type are subjected to many severe and unnecessary shocks and strains which quickly wear them out or weaken their vital parts so that constant repair and attention is necessary. Furthermore, it requires more tractive force or motive power to move cars especially when loaded to capacity, when the trucks do not yield or give to a certain extent to the varying conditions of hauling and track. Various so called flexible truck constructions have been devised to overcome these difficulties, but in practice, many of them fall short of their purpose for the reason that the movement or play provided between the bolsters and side truck frames, which renders the truck capable of accommodating itself to varying track conditions, is either not positively provided for, or else the construction is such that there can be no rocking or rolling at the bearings of the bolster in the side frames. This particular rocking or rolling movement is the most desirable and effectual motion for this purpose, as will be more fully apparent as the nature of the present construction is better understood, and cannot ordinarily be accomplished without departing from the conventional design of standard truck frames such as the well known arch-bar and diamond truck types almost universally used.

Accordingly, the present invention contemplates as its principal object the provision of a spring bolster bearing which includes a plurality of opposing and interlocking concave and convex bearing surfaces on the spring bolster and truck frames, and which bearing surfaces represent the arcs of circles of different radii, to produce a true rocking or rolling motion between the ends of the spring bolster and the truck frames.

A further object of the invention is to provide a bolster of this character that will automatically center itself when the trucks are traveling over level track, and which will also shift the center of gravity to either side of the center line of the truck frames according to whether the leading or following wheels of the truck are in a depressed portion of the track, thereby relieving the wheels, journals, and other parts of the truck of undue strains and rupturing stresses when the car is traveling with a capacity load. This feature involves another valuable aspect inasmuch as it reduces the wear and friction between the movable parts and makes lubrication thereof entirely unnecessary, as the parts do not slide at any point, but merely rock or roll without grinding or impinging on the contacting bearing surfaces.

Another object of the invention is to provide a durable and practical bolster construction which materially increases the efficiency of the truck, and includes a minimum number of parts which require very little machining after they come from the mold, thereby facilitating the assembling and manufacture of the truck and at the same time saving manual labor and cost of manufacture.

A further object of the invention is to provide an interlocking bolster and truck frame bearing which will not only have a self centering function as above pointed out and permit the ends of the truck frames to freely move in a vertical plane, but will also prevent the truck frames from spreading by no other means than the curved interlocking bearing surfaces. This interlock also fulfils the purpose of keeping the opposite truck frames parallel and insures a safe and reliable connection which freely yields to all service conditions.

As a general object including all of the other special objects, the invention provides a device permitting of a true rocking or rolling motion between the ends of the spring bolster and the truck frames, because of the curved bearing surfaces of different radii, thus distinguishing from those devices wherein the bearing parts either in the form of a part or a complete circle are in complete and close contact so that they have a sliding and grinding action rather than the true rocking or rolling effect sought to be accomplished by the present invention.

With the above and other objects in view which will more readily appear as the nature of the invention is better understood, the same consists in the novel construction, combination and arrangement of parts hereinafter more fully described, illustrated and claimed.

A preferred and practical embodiment of the invention is disclosed in the accompanying drawings, in which—

Figure 1 is an elevation of one of the side frames of a truck showing my improved spring bolster bearing applied thereto. Fig. 2 is a vertical sectional view on the line 2—2 of Fig. 1. Fig. 3 is an enlarged detail view showing in elevation the spring bolster bearing block in its bearing seat in the truck frame. Fig. 4 is a view similar to Fig. 3 showing the spring bolster bearing block partly in section. Fig. 5 is a detail end elevation of the spring bolster bearing block.

Similar reference characters designate corresponding parts in the several figures of the drawings.

In carrying out the present invention, it is proposed to use the same in connection with standard truck frames as far as possible, and in this connection it will be observed from Fig. 1 of the drawings, that the reference numeral 1 designates in its entirety one of the side frames of a cast steel side frame truck T. The only difference between the truck frame used in connection with the present invention and that ordinarily used of the general type shown in the drawing, is to be found in the spring bolster bearing seat. It is obvious that the addition of this element only necessitates a slight and inexpensive change in the pattern of the truck to adapt it to the present invention.

With particular reference to the specific details of construction disclosed in the drawings, it will be observed that the truck frame 1 includes the usual pedestals 2 which slidably receive the usual truck bolster 3. In connection with the mounting of the latter in the truck frames, it will be noted that the walls 4 of the guides at each side of the truck bolster are slightly rounded at their upper lower corners as at 5 so as to permit the bolster to have a relative rocking effect within the truck frame which may be necessary under extreme working conditions, though the major part of the rock takes place in the bolster hereinafter referred to as the spring bolster. The said truck bolster 3 is supported on a plurality of helical springs 6, the lower ends of which bear upon the transverse spring bolster 7 that is preferably made of channeled metal as shown in the drawings to increase its strength and rigidity. Suitably secured to the end of the spring bolster 7 directly beneath the helical springs 6 is a bolster rocker-block 8 designed to interlock with and bear against a rocker bearing-seat 9 in the truck frame. The said rocker-block 8 is preferably made in a single casting and secured to the spring bolster 7, though of course it will be understood that if found expedient, this bearing block may be cast, pressed or forged integral with the spring bolster and the same effective results obtained. By reference to Fig. 5, it will be apparent that this block 8 includes the opposite side bolting flanges 10, and a convex center-bearing portion 11 having on each side thereof the rocker ribs 12 and 13 having the concaved bearing edges 14 and 15 respectively. The extreme ends of the rocker ribs 12 and 13 thus project downwardly to form locking flanges 16 and 17.

The rocker block 8 carried by the spring bolster, and as above described is designed to have a rolling bearing in the rocker seat 9 which essentially comprises a plurality of bearing units in the form of a concaved center bearing element 18 whose bearing surface 19 represents an arc of greater radius than the convex center-bearing of the block 8 which it receives, and the convexed frame beads 20—21 of the truck frame upon which rest the concaved edges 14 and 15 of the rocker ribs 12 and 13. This arrangement produces a continuous bearing directly at the center of this structure as will be observed from Fig. 2. That is to say, the crown 11ª of the convex center-bearing 11 of the block 8 rests upon the middle portion of the concave bearing surface 19 of the element 18 and at the same time the intermediate portions of the concave edges 14 and 15 of the rocker ribs 12 and 13 have a rocking contact with the crown of the convexed beads or bearing units 20 and 21.

An important feature of all of the rocker bearing units is that they represent curves or arcs of different radii from the radii of the complemental bearing portions of the rocker-block. In other words, it will be noted from the several figures of the drawings that the concave bearing face 19 of the rocker bearing seat 9 is of greater diameter than the convexed center bearing 11 of the block 8. Likewise, the concave edges 14 and 15 of the ribs 12 and 13 represent curves of different radii from the bearing units 20 and 21, thus producing a construction which is capable of a rocking or rolling motion and which in no instance slides even though the center of gravity does change.

When the truck is traveling over level tracks the great weight of the car body and contents is supported on a line directly where the line 2—2 appears on Fig. 1, and the center of gravity also locates itself at this point. However, if the leading wheel, for instance, should drop into a track depression or low joint, the center of gravity would be shifted to the rear, or in other words the bearing points of contact of the block 8 and rocker seat 9 would be transferred to one side of the line 2—2 thereby evenly distributing the superposed weight on both wheels instead of transferring it solely to the following wheel as would be the case with a rigid truck construction. When the front or leading wheel runs out of the depression or low joint the center of gravity will be shifted forward of the center of the side frame relieving the strain on the rear wheel.

The rocking of the various opposing curved surfaces always tends to return the block 8 to its normal position. That is, the effect of these counteracting curved surfaces is to automatically maintain the center of gravity at the center line of the truck, but they of course readily permit the shifting of this point to relieve the strain and shocks incident to traffic conditions. The degree of motion between these parts is necessarily susceptible of wide variation to meet all service conditions and types of trucks, and to accomplish this result it is only necessary to change the relative radii of the opposing bearing surfaces on the bolster and frames.

In assembling the truck parts it is only necessary to drop the spring bolster 7 on to the side frames 1 in such a manner that the blocks 8 rest in the rocker seats 9. When in this relation the flanges 16 and 17 of the rocker ribs straddle the bearing element 18 and thus effectually prevent any tendency of the spring bolster 7 to twist or turn out of transverse alinement and at the same time maintain a lock between the opposite truck frames which not only prevents them from spreading apart but keeps them parallel.

In view of the detailed description of the several parts of the invention it will be obvious that a distinct rocking or rolling motion is provided between the spring bolster and the truck frames, as distinguished from a sliding or turning motion in some cases utilized to give a yielding tendency to truck frames in a vertical plane. This effect can only be obtained through the use of curved bearing surfaces that represent parts of circles of different diameters. In other words, the present invention is entirely foreign to any construction which involves bearing surfaces that are in continuous contact throughout their bearing and which instead of a rocking or rolling motion involve a rotary or reciprocating action which it is desirable to eliminate. Where sliding surfaces are relied upon it often happens that they stick under the tremendous superposed weight and serious breakages or ruptures result, hence by doing away with them and providing a construction which cannot possibly be open to these objections, the efficiency of the truck is greatly enhanced. The frame beads 20—21 are also of special practical importance in that this type of construction will greatly strengthen the truck frame as compared with the usual horizontal design of bottom bearing on a truck frame. The bead 20 provides a strengthening arch which in turn is reinforced by the curved element 19.

From the foregoing it is thought that the many features and advantages of the invention will be readily apparent, and it will of course be understood that various changes and minor details of construction may be resorted to without departing from the spirit of the invention or scope of the appended claims.

I claim:

1. A spring bolster bearing for car trucks including the truck side frame provided with a stationary curved rocker bearing-seat, and the spring bolster carrying a rocker-block provided with a curved rolling surface contacting with said bearing-seat and having an arc of different radius from that of the bearing-seat.

2. A spring bolster bearing for car trucks including the truck side frame provided with a stationary curved rocker bearing-seat having a plurality of curved bearing units, and the spring bolster having a rocker-block provided with a plurality of curved rolling surfaces representing arcs of different radii and respectively engaging the separate bearing units.

3. A spring bolster bearing for car trucks including the truck side frame provided with a stationary curved rocker bearing-seat having a plurality of curved bearing units, and the spring bolster having a rocker-block provided with a plurality of curved rolling surfaces respectively engaging the separate bearing units, said rolling surfaces of the rocker-block representing arcs of different radii from those of the said units.

4. A spring bolster bearing for car trucks including the truck side frame provided with a stationary curved rocker bearing-seat having a plurality of curved bearing units reversely related to one another, and a spring bolster carrying a rocker-block having a plurality of curved rolling surfaces also reversely related to one another and respectively engaging the separate bearing units of the bearing-seat.

5. A spring bolster for car trucks including the truck side frame provided with a stationary curved rocker bearing-seat having a plurality of curved bearing units reversely related to one another, and a spring bolster carrying a rocker-block having a plurality of curved rolling surfaces representing arcs of different radii from those of the said units, said curved rolling surfaces also reversely related and respectively engaging the separate bearing units of the bearing-seat.

6. A spring bolster bearing for car trucks including the truck side frame provided with a stationary curved rocker bearing-seat, and a spring bolster carrying a rocker-block provided with a curved rolling surface having an interlocking engagement with said bearing-seat, and representing an arc of different radius from that of the bearing seat.

7. A spring bolster bearing for car trucks including the truck side frame provided with a stationary curved rocker bearing-seat having a plurality of curved bearing units, and the spring bolster having a rocker-block provided with a plurality of curved rolling surfaces representing arcs of different radii and respectively engaging the separate bearing units, and also having locking flanges respectively bearing upon and engaging with the separate bearing units.

8. A spring bolster bearing for car trucks including the truck side frame provided with a stationary curved rocker bearing-seat, said seat comprising a central bearing element having a concaved bearing surface and convexed frame ribs on each side thereof constituting reversely arranged bearing units, and a spring bolster carrying a rocker-block provided with curved rolling surfaces contacting with complemental surfaces on the bearing seat, said rolling surfaces representing arcs of different radii from the complemental bearing portions of the bearing seat.

9. A spring bolster bearing for car trucks including the truck side frame provided with a stationary curved rocker bearing-seat, and the spring bolster carrying a rocker-block provided with a convexed center bearing and opposite rocker ribs having concaved bearing edges for contacting with complemental parts of the bearing seat, the bearing surface of said center bearing and rocker ribs representing arcs of different radii from the complemental parts of the bearing seat.

10. A spring bolster bearing for car trucks including the truck side frame provided with a stationary curved rocker bearing-seat, said seat comprising a central bearing element having a concaved bearing surface and convexed frame ribs on each side thereof, and the spring bolster having a rocker block provided with a convexed center bearing representing an arc of lesser diameter than the concaved surface of the bearing seat and adapted to bear thereon, said rocker block also provided with rocker ribs having concaved bearing edges which represent arcs of greater diameter than the frame ribs upon which they rock.

11. A car truck construction including a truck side frame provided with an arched member, a supporting and reinforcing bead thereover, and the spring bolster having a bearing seat on said arched member.

12. A spring bolster bearing for car trucks including the truck side frame provided with a stationary curved rocker bearing-seat, said seat comprising a central concaved bearing portion and opposite convexed frame ribs, and a spring bolster carrying a rocker block provided with a convexed center bearing and opposite rocker ribs having concaved bearing edges, and also having end flanges for straddling the central bearing element of the bearing seat.

13. A spring bolster bearing for car trucks including the truck side frame provided with a stationary curved bearing-seat comprising a plurality of reversely arranged bearing units, and a spring bolster carrying a rocker block having a plurality of reversely arranged bearing surfaces for contacting with complemental portions of the bearing seat, said complemental bearing portions representing arcs of different radii to maintain a solid contact transversely of the bearing as the center of gravity shifts.

In testimony whereof I hereunto affix my signature in the presence of two witnesses.

JOHN A. TURNER.

Witnesses:
H. C. SACKHOFF,
GEO. O. BANCROFT.